(12) United States Patent
Spangler et al.

(10) Patent No.: US 11,673,451 B2
(45) Date of Patent: Jun. 13, 2023

(54) WASTE HEAT SCAVENGING METHOD AND SYSTEM FOR A WORK MACHINE

(71) Applicant: DEERE & COMPANY, Moline, IL (US)

(72) Inventors: Brian D. Spangler, Dubuque, IA (US); Celesta K. Milanowski, Bettendorf, IA (US)

(73) Assignee: Deere & Company, Moline, IL (US)

( * ) Notice: Subject to any disclaimer, the term of this patent is extended or adjusted under 35 U.S.C. 154(b) by 519 days.

(21) Appl. No.: 16/940,844

(22) Filed: Jul. 28, 2020

(65) Prior Publication Data

US 2022/0032733 A1 Feb. 3, 2022

(51) Int. Cl.

| | |
|---|---|
| *B60H 1/02* | (2006.01) |
| *E02F 9/08* | (2006.01) |
| *E02F 9/16* | (2006.01) |
| *F15B 21/0423* | (2019.01) |
| *H02K 9/19* | (2006.01) |
| *B60H 1/14* | (2006.01) |

(Continued)

(52) U.S. Cl.
CPC ............... *B60H 1/02* (2013.01); *B60H 1/034* (2013.01); *B60H 1/143* (2013.01); *E02F 9/0866* (2013.01); *E02F 9/16* (2013.01); *F15B 21/0423* (2019.01); *H02K 9/19* (2013.01); *B60N 2/56* (2013.01); *E02F 3/961* (2013.01); *E02F 9/2221* (2013.01)

(58) Field of Classification Search
CPC ........ B60H 1/02; B60H 1/034; B60H 1/2221; B60H 1/00357; B60H 1/00271; B60H 1/00285; B60H 1/00899; B60H 1/04; E02F 9/0866; E02F 9/16; E02F 9/2221; E02F 9/2075; E02F 9/2095; E02F 9/226; E02F 3/961; F15B 21/0423; H02K 9/19; B60N 2/56; B60K 1/00; B60K 11/02; B62D 33/0617; B60Y 2200/41; F16H 57/0413; F16H 57/0416; F16H 57/0417
See application file for complete search history.

(56) References Cited

U.S. PATENT DOCUMENTS

| | | | | |
|---|---|---|---|---|
| 5,255,733 A | * | 10/1993 | King | ..................... F01P 7/165 165/41 |
| 6,758,266 B1 | * | 7/2004 | Sjunnesson | ............. B60R 17/02 165/253 |

(Continued)

FOREIGN PATENT DOCUMENTS

| | | | |
|---|---|---|---|
| JP | 2013002160 A | * | 1/2013 |
| JP | 2013002160 A | | 1/2013 |

*Primary Examiner* — Emmanuel E Duke (57) ABSTRACT

A work machine including a prime mover, an electric motor, an electric motor fluid circuit, a transmission fluid circuit, a hydraulic circuit, a cooling circuit, a pump, and a controller. The electric motor may supply a portion of power of the prime mover. The electric motor fluid circuit may be adapted to remove waste heat from the electric motor. The transmission fluid circuit may be adapted to lubricate a moving part of a transmission powered by the prime mover. The hydraulic circuit may be adapted to transmit power from the prime mover to a moving component of the work machine. The cooling circuit may be absorbing waste heat from one or more of the electric motor fluid circuit, the transmission fluid circuit, and the hydraulic circuit. The control may be adapted to control diversion of a portion of waste heat from the cooling circuit to a portion of the cab.

20 Claims, 4 Drawing Sheets

(51) Int. Cl.
*B60H 1/03* (2006.01)
*E02F 3/96* (2006.01)
*E02F 9/22* (2006.01)
*B60N 2/56* (2006.01)

(56) References Cited

U.S. PATENT DOCUMENTS

| | | |
|---|---|---|
| 7,478,671 B2 | 1/2009 | Ikeda et al. |
| 7,533,637 B2 | 5/2009 | Soderberg |
| 8,905,321 B2 | 12/2014 | Elliott |
| 10,000,908 B2 | 6/2018 | Ota et al. |
| 2017/0284062 A1 | 10/2017 | Osaka et al. |

\* cited by examiner

WASTE HEAT SCAVENGING METHOD AND SYSTEM FOR A WORK MACHINE

CROSS-REFERENCE TO RELATED APPLICATIONS

N/A

FIELD OF THE DISCLOSURE

The present disclosure relates to a waste heat scavenging system and method on a work machine.

BACKGROUND

With the interest of energy saving and eco-friendlier products growing, vehicles of hybrid and electric form have become more prevalent in the automobile industry and have now crossed over into work machines. However, the heavy workload actions such as excavation, load carrying, and carving the ground surface requires large amounts of power. Work machines, such as backhoe loaders, have hydraulic systems to enable its function of moving large loads with precision and repetition. The hydraulic systems have been powered typically been powered by fuel. With energy saving products, power efficiency and the refinement of power consumption become essential in balancing a work machine's size and function when increased power usage require ever increasing sized batteries. Therein lies a need for optimizing systems for any energy consumed, including heating of a cab and the components therein.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes an apparatus for scavenging waste heat to heat a portion of a cab on a work machine. The work machine comprises of a prime mover, an electric motor fluid circuit, a transmission fluid circuit, a hydraulic circuit, a cooling circuit, and a controller. The prime mover may comprise an electric motor supplying at least a portion of the power of the prime mover. The electric motor fluid circuit may be adapted to remove waste heat from the electric motor. The transmission motor fluid circuit may be adapted to remove waste heat from the electric motor. The transmission fluid circuit may be adapted to lubricate a moving part of a transmission powered by the prime mover wherein the transmission fluid circuit may include waste heat. The hydraulic circuit may be adapted to transmit power from the prime mover to a moving component of the work machine, wherein the hydraulic circuit may include waste heat. The cooling circuit may circulate a cooling medium wherein the cooling circuit absorbs waste heat from one or more of the electric motor fluid circuit, the transmission fluid circuit, and the hydraulic circuit. The controller may be adapted to control diversion of at least a portion of the waste heat from the cooling circuit to at least a portion of the cab of the work machine.

The work machine may further comprise a heat exchanger wherein the heat exchanger bypass valve restricts a portion of waste heat transfer from one or more of the electric motor fluid circuit, the transmission fluid circuit, and the hydraulic circuit to the cooling circuit. The heat exchanger bypass valve may move to a full bypass position when one or more of a target cooling circuit temperature and target cab temperature is reached. The full bypass position restricts all waste heat transfer from one or more of the electric motor fluid circuit, the transmission fluid circuit, and the hydraulic circuit, to the cooling circuit when one or more of the target cooling circuit temperature and a target cab temperature is reached.

The work machine may further comprise a proportional valve coupled to one or more of the cooling circuit, the electric motor fluid circuit, the transmission fluid circuit, and the hydraulic circuit. The proportional valve may divert a portion of the waste heat from the cooling circuit to the atmosphere, or ambient temperature, based on one or more of a target oil circuit temperature, target cooling circuit temperature and a target cab temperature.

According to an aspect of the present disclosure, the cooling circuit may comprise of a cab heating portion positioned one or more of adjacent to the cab and within the cab.

According to another aspect of the disclosure, the cab heating portion may heat one or more of the cab air temperature, a cab seat, and a control handle.

According to another aspect of the disclosure, the controller may control diversion of the waste heat based on one or more of the target cooling circuit temperature, the cooling circuit temperature, the cab temperature, and the target cab temperature.

The work machine may further comprise an electric cab heater coupled to one or more of the cooling circuit and the cab, the electric cab heater supplementing heat to at least the portion of the cab.

The controller may control a rate of diversion of the waste heat by adjusting the pump rate of the cooling medium by a pump coupled to the cooling circuit. The cooling medium may comprise of one or more of water and glycol.

According to another aspect of the disclosure, a system for scavenging waste heat associated with a work machine including a hydraulic circuit and a transmission fluid circuit may comprise of a prime mover, an electric cab heater, and a controller. The electric cab heater may be adapted to supply heat to at least a portion of the cab. The controller may be adapted to coordinate a scavenging of waste heat wherein the controller is adapted to control diversion of a portion of the waste heat created by one or more of the hydraulic circuit, the transmission fluid circuit, and the prime mover such that at least a portion of a demand for power from the electric cab heater is offset by the waste heat created, in response to an increase in demand for power associated with operation of the electric cab heater.

According to another aspect of the present disclosure, a method for scavenging waste heat from a work machine for heating a cab may comprise of the following: providing one or more of an electric motor fluid circuit, a transmission fluid circuit, and a hydraulic fluid circuit; providing a cooling circuit circulating a cooling medium, the cooling circuit coupled to one or more or more of the electric motor fluid circuit, a transmission fluid circuit, and a hydraulic fluid circuit; absorbing a waste heat by the cooling circuit through a heat exchanger from one or more of the electric motor fluid circuit, the transmission fluid circuit, and the hydraulic circuit; diverting waste heat in the cooling circuit towards the cab of the work machine; and releasing waste heat through a heat exchanger in at least a portion of the cab of the work machine. The method may further comprise restricting waste heat from being released to at least a portion of the cab when one or more of a target cooling circuit temperature and a target cab temperature is reached.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure. Although the present disclosure relates to an electric or hybrid work machine, it may also apply to traditional fuel powered work machines.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

As used herein, the term "valve" may be an electronically or mechanically controlled device that directs flow of a fluid by opening, closing, or partially obstructing various passageways in a circuit.

Figure 1:
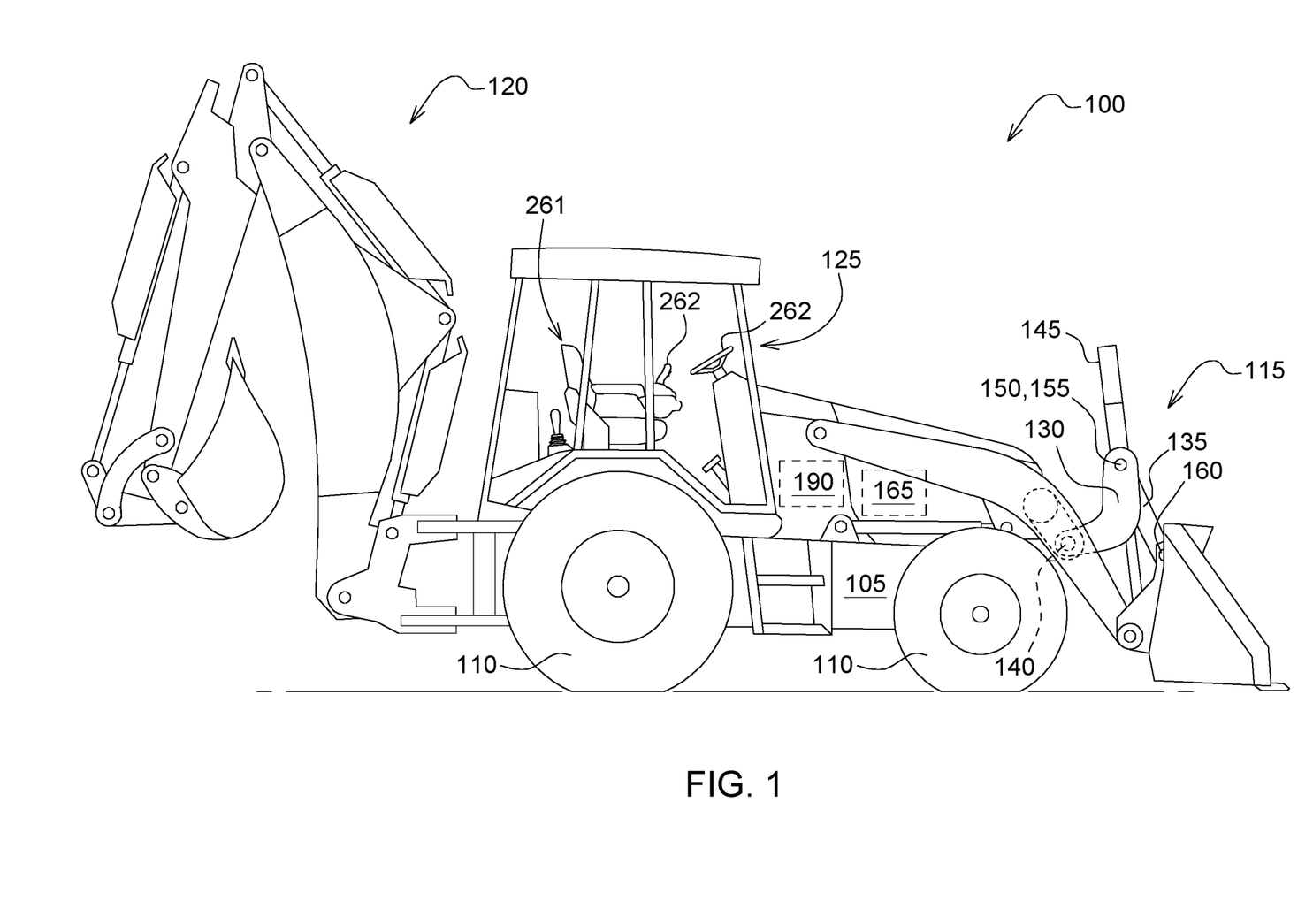
FIG. 1 is a perspective view of an exemplary embodiment, a backhoe loader.
Figure 2:
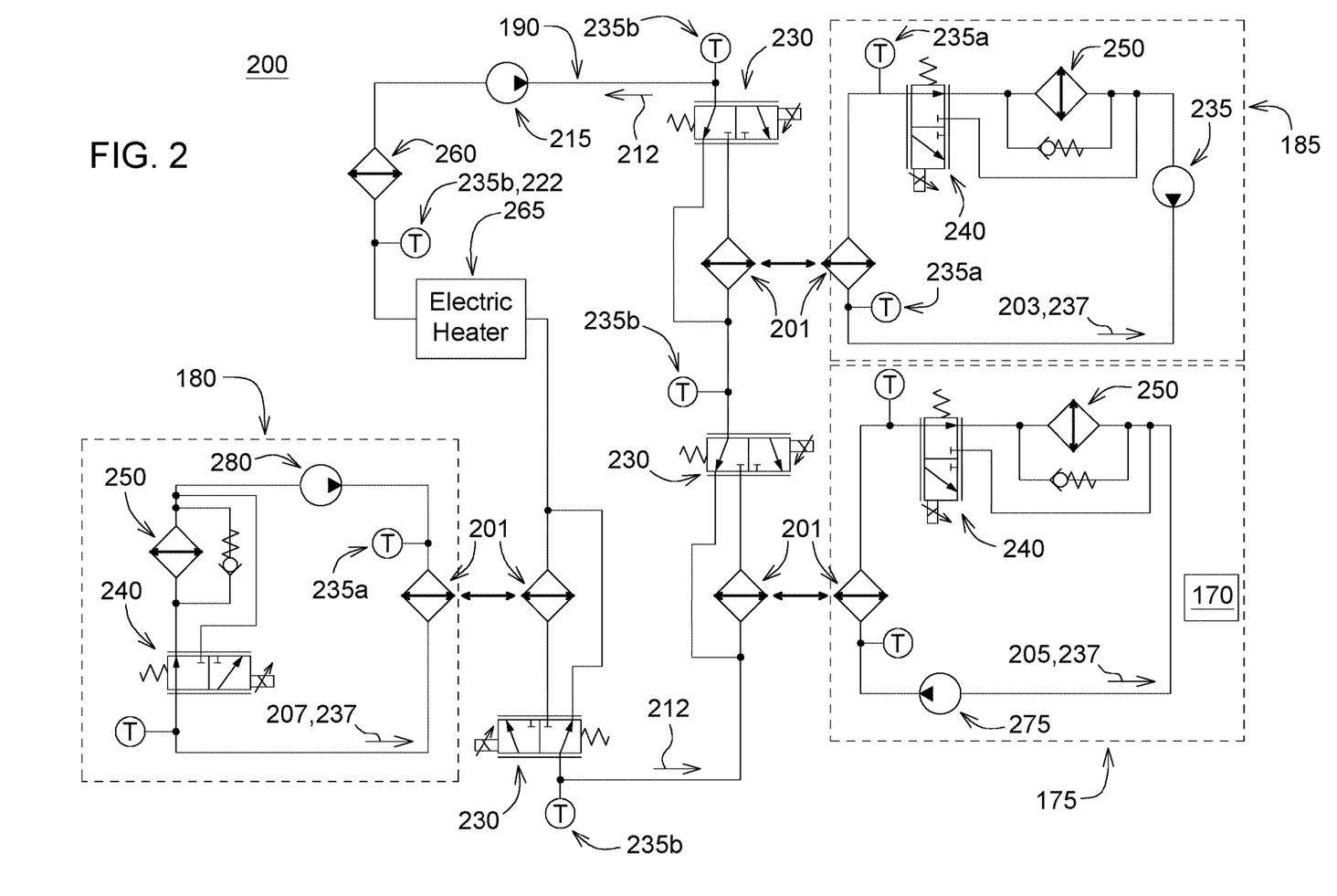
FIG. 2 is a high-level hydraulic-pneumatic schematic of a first embodiment of a waste heat scavenging system as applied to a backhoe loader.

FIG. 1 illustrates an exemplary work machine 100, a backhoe loader in which the waste heat scavenging system 200 may be used. FIG. 2 is a high-level schematic of the waste heat scavenging system 200 as it relates to the present embodiment.

The backhoe loader has a frame 105, to which are coupled a ground-engaging mechanism 110 for supporting and propelling the work machine 100. Attached to the front of the work machine is a loader assembly 115 and attached to the rear of the vehicle is a backhoe assembly 120. An operator controls the functions of the work machine 100 from a cab 125 (also referred to hereinafter as cab). Both the loader assembly 115 and the backhoe assembly 120 perform a variety of material handling functions. The linkage includes a boom link 130 and a bucket link 135. The boom link 130 is pivotally attached to the boom at a first boom link pivot 140 and pivotally attached to a loader bucket hydraulic cylinder 145 at a second boom link pivot 150. The bucket link 135 is pivotally attached to the loader bucket hydraulic cylinder 145 at a first bucket link pivot 155 and pivotally attached to the bucket at a second bucket link pivot 160. In this particular case, the second boom link pivot 150 and the first bucket link pivot 155 are the same, (i.e. they are both at the same pivot axis). As the loader bucket hydraulic cylinder 145 extends and retracts, an angle between the boom link 130 and the bucket link 135 decreases and increases respectively.

The work machine 100 comprises a prime mover 165, an electric motor 170, an electric motor fluid circuit 175, a transmission fluid circuit 180, a hydraulic circuit 185, a cooling circuit 190, and a controller 195.

The prime mover 165 may include any power source to provide rotational driveline power and/or power to the hydraulic system. For example, the prime mover 165, may include, but is not limited to, an internal combustion engine, a piston engine, a rotary engine, a hydraulic motor, a hydrostatic system, an electric motor, etc. In a hybrid configuration, a battery 197 may supply at least a portion of power of the prime mover 165. In a pure electric configuration, a battery 197 may be the primary source of power for an electric motor 170 on the prime mover 165. In either configuration, in order to optimize the energy utilization of the battery 197, the cooling circuit 190 is able to scavenge waste heat 198 that is normally rejected to atmosphere 245 to heat at least a portion of the cab 125. The cooling circuit 190 may accomplish this by using liquid-to-liquid heat exchangers 201 to transfer waste heat 198 from hydraulic oil 203 in a hydraulic circuit 185, electric motor cooling fluid 205 in an electric motor fluid circuit 175, and the transmission/hydrostatic oil 207 from the transmission fluid circuit 180. This transfer of waste heat 198 may occur from a single or any combination of the three circuits (175, 180, 185) and in any order to the water and/or glycol 209 in the cooling circuit 190.

The electric motor fluid circuit 175 may be adapted to remove waste heat 198 from the electric motor 170. The transmission fluid circuit 180 may be adapted to lubricate a moving part of the transmission powered by the prime mover 165. The hydraulic circuit 185 may be adapted to transmit power from the prime mover 165 to a moving component of the work machine 100. For example, in the present embodiment, a moving component may include the backhoe assembly 120 and the loader assembly 115.

The cooling circuit 190 may circulate a cooling medium 212. The cooling circuit 190 may absorb waste heat 198 from one or more of the electric motor fluid circuit 175, the transmission fluid circuit 180, and the hydraulic circuit 185. The cooling medium 212 may comprise one or more of water and glycol 209 in the present embodiment. However, in alternative embodiments, the cooling medium 212 may include water, propylene glycol, ethylene glycol, oil and/or a suitable refrigerant to move waste heat 198.

A pump 215 for the cooling circuit 190 may adjust the rate of circulation of the cooling medium 212. Each respective oil circuit (175, 180, 185) may have their own pump (275, 280, 285) to adjust the rate of circulation of the medium in each respective oil circuit.

Figure 3:
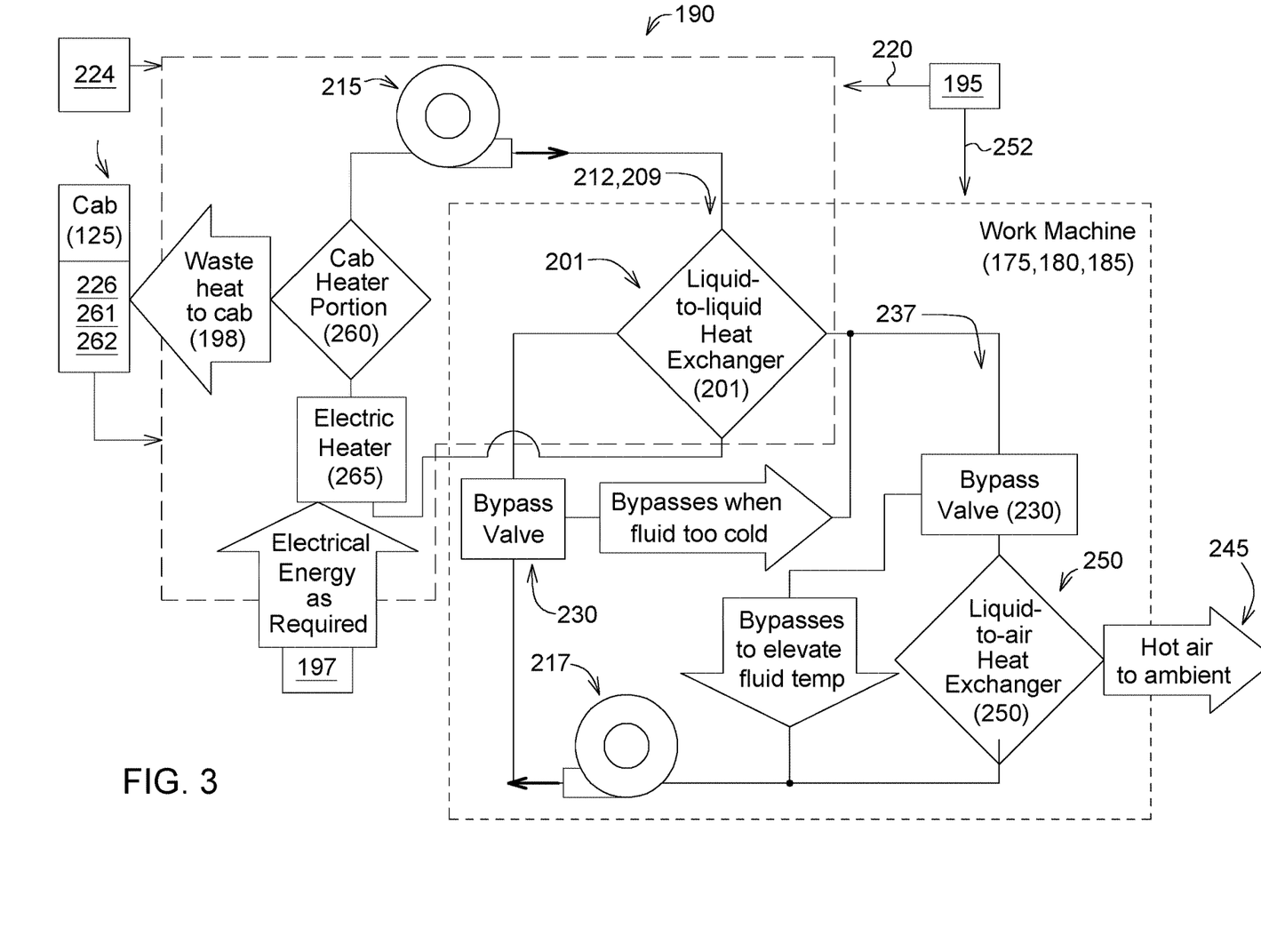
FIG. 3 is a flowchart schematic of the first embodiment of the waste heat scavenging system as shown in FIG. 2.

Now turning to FIG. 3, with continued reference to FIGS. 1 and 2, the controller 195 may be adapted to control diversion of at least a portion of the waste heat 198 from the cooling circuit 190 to at least a portion of a cab 125 of the work machine 100. The controller 195 may control diversion of waste heat 198 based on one or more of a target cooling circuit temperature 220, the cooling circuit temperature 222, the target cab temperature 224, and the cab temperature 226. The controller 195 may control the rate of diversion of the waste heat 198 by adjusting the pump rate of the cooling medium 212 by the pump 215.

The work machine may further comprise a heat exchanger 201. While using a liquid-to-liquid heat exchanger 201, waste heat 198 is transferred from each oil circuit (175, 180, 185) to the cooling medium 212 in the cooling circuit 190. The heat exchanger 201 may include a bypass valve 230 wherein the heat exchanger bypass valve 230 restricts a portion of waste heat 198 transfer from one or more of the electric motor fluid circuit 175, the transmission fluid circuit 180, and the hydraulic circuit 185 to the cooling circuit 190. The system advantageously harvests energy (i.e. waste heat 198) that would otherwise be lost to the atmosphere 245 in standard operation of the work machine 100. The heat exchanger bypass valve 230 comprises at least two temperature sensors 235, a first temperature sensor 235a in the oil 237, and a second temperature sensor 235b in the cooling medium 212. If the oil 237 is hotter than the cooling medium 212, the cooling medium 212 flows through the heat exchanger 201 to capture the waste heat 198. If the oil 237 is colder than the cooling medium 212, the cooling medium 212 bypasses the heat exchanger 201 to ensure that any heat is not rejected to the oil 237. The afore-mentioned description may apply to each of the circuits (175, 180, 185). Alternatively, and demonstrated in FIG. 3, the oil 237 (and not the cooling medium 212) may bypass the heat exchanger 201 to ensure a heat transfer does not occur.

The heat exchanger bypass valve 230 may move to a full bypass position when one or more of a target cooling circuit temperature 220 and a target cab air temperature 224 is reached. The full bypass position restricts all waste heat 198 from one or more of the electric motor fluid circuit 175, the transmission fluid circuit 180, and the hydraulic circuit 185, to the cooling circuit 190 upon reaching either or both of the target temperatures (220, 224).

The work machine 100 may further comprise a proportional valve 240 coupled to one or more of the cooling circuit 190, the electric motor fluid circuit 175, the transmission fluid circuit 180, and the hydraulic circuit 185. To optimize control of the amount of waste heat 198 transfer from one or more of cooling medium 212 and oil 237 to the atmosphere 245, a proportional valve 240 may divert a portion of waste heat 198 from the liquid-to-air heat exchanger 250 that rejects waste heat 198 from the cooling circuit 190 and or oil circuits (175, 180, 185) to the atmosphere 245 based on one or more of a target cooling circuit temperature 220, a target cab temperature 224, and a target oil temperature 252. In one exemplary embodiment, it may use a temperature sensor 235a in the oil 237 to reach target oil temperature 252. If the oil 237 is colder than the target oil temperature 252, the oil 237 bypasses the liquid-to-air heat exchanger 250 in order to allow of the waste heat 198 to be sent to the cooling circuit 190. Once the oil 237 reaches the target oil temperature 252, the proportional valve 240 will continuously adjust the amount of bypass flow required to maintain the target oil temperature 252 in the oil circuit (175, 180, 185). If the proportional valve 240 reaches the fully closed position and additional heat rejection to atmosphere 245 is needed, a cooling fan 255 will adjust its speed to maintain the oil circuit (175, 180, 185) at it target oil temperature 252. The afore-mentioned description may apply to each respective oil circuit (175, 180, 185) and/or the cooling circuit 190 (wherein the proportional valve 240 is not shown). Each respective oil circuit (175, 180, 185) may have each of their own respective target oil temperature 252 setting wherein the proportional valve may adjusted to the respective position based on the flow rate for each respective oil circuit (175, 180, 185) and the oil temperature.

The cooling circuit 190 comprises a cab heating portion 260 positioned one or more of adjacent to the cab 125 and within the cab 125.

The cab heating portion 260 may heat one or more of the cab air temperature 226, a cab seat 261, and a control handle 262.

In scenarios where an insufficient amount of waste heat 198 is transferred to the cooling circuit 190, an electric cab heater 265 may provide the additional energy required. In a first embodiment, the electric cab heater 265 may comprise of an electric water heater and be coupled to the cooling circuit. In a second embodiment, the electric cab heater 265 may comprise of an electric air heater, and be coupled to the cab 125, thereby blowing heated air directly into the cab 125. The electric cab heater 265 may supplement heat to at least a portion of the cab 260. The portion of the cab 260 may include the cooling circuit 190 comprising a cab heating portion 260 located within the cab or adjacent to (as shown in FIG. 1).

Alternatively, in another embodiment, and also illustrated by FIGS. 1 and 2, the system 200 for scavenging waste heat 198 for a work machine 100 having a hydraulic circuit 185 and a transmission fluid circuit 180 may be described as follows. The system 200 may comprise of a prime mover 165, an electric cab heater 265, and a controller 195. The prime mover 165 may be electrically sourced and adapted to supply mechanical energy for operation of the work machine 100. The electric cab heater 265 may be adapted to heat at least a portion of the cab 125. The controller 195 may be adapted to control diversion of a portion of the waste heat 198 created by one or more of the hydraulic circuit 185, the transmission fluid circuit 180, and the prime mover 165 such that at least a portion of a demand for power from the electric cab heater 265 is offset by the waste heat 198 created, in response to an increase in demand for power associated with operation of the electric cab heater 265. That is, as the work machine 100 operates components such as the hydraulics (i.e. the hydraulic circuit 185), transmission (i.e. the transmission fluid circuit 180), and the prime mover 165, the power required to run the electric cab heater 265 to bring at least a portion of the cab to a target temperature 224, may be offset by redirecting the waste heat 198 from the components to the cab 125.

Figure 4:
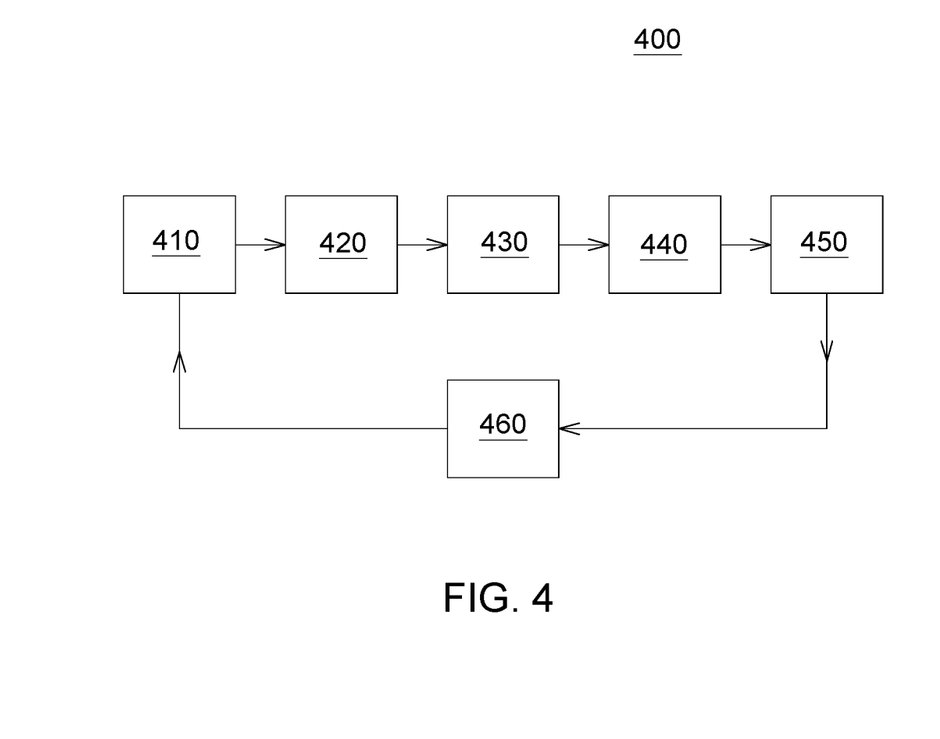
FIG. 4 is a flowchart of a method of scavenging waste heat from the work machine to heat the cab.

Now turning to FIG. 4, a method 400 of scavenging waste heat 198 from a work machine 100 for heating a cab 125 is shown. In a first step 410, the method comprises providing one or more of an electric motor fluid circuit, a transmission fluid circuit, and a hydraulic fluid circuit. In a next step 420, the method 400 comprises providing a cooling circuit 190 circulating a cooling medium 212. The cooling circuit 190 may be coupled to one ore more of the electric motor fluid circuit 175, a transmission fluid circuit 180, and a hydraulic circuit 185. In a next step 430, the method 400 comprises absorbing waste heat 198 by the cooling circuit 190 through a heat exchanger 201 from one or more of the electric motor fluid circuit 175, the transmission fluid circuit 180, and the hydraulic circuit 185. In a next step 440, the method 400 comprises diverting waste heat 198 in the cooling circuit 190 towards the cab 125 of the work machine 100. In step 450, the method 400 comprises releasing waste heat 198 through a heat exchanger 201 in at least a portion of the cab 260 of the work machine 100. At 460, as part of a feedback mechanism, when a target cooling circuit temperature 220 and a target cab temperature 224 is reached, the method 400 may comprise of restricting waste heat 198 from being released to at least a portion of the cab 260 from one or more of electric motor fluid circuit 175, the transmission fluid circuit 180, and the hydraulic circuit 185, to the cooling circuit 190. This may be achieved by placing the heat exchanger bypass valve 230 to a full bypass position. A controller 195 may be adapted to coordinate diversion of waste heat 198 from one or more the electric motor fluid circuit 175, the transmission fluid circuit 180, and the hydraulic circuit 185, and release waste heat 198 to at least the portion of the cab 125 through a heat exchanger 250. This coordination may, for example, comprise of controlling the rate and timing of diverting and releasing waste heat 198 through the coordination of controlling the pump 215 for each respective circuit (175, 180, 185), and the coordination of adjusting the flow rate through the various valves (230, 240). In one exemplary embodiment, the heat exchanger 201 may comprise of a heat exchanger bypass valve 230, wherein the heat exchanger bypass valve 201 restricts a portion of waste heat 198 transfer from one or more of the electric motor fluid circuit 175, the transmission fluid circuit 180, and the hydraulic circuit 185, to the cooling circuit 190. This may occur when the heat exchanger bypass valve 230 moves to a full bypass position.

The controller 195 may also be adapted to control one or more a proportional valves 240 coupled to one or more of the cooling circuit 190, the electric motor fluid circuit 175, the transmission fluid circuit 180, and the hydraulic circuit 185. To optimize control of the amount of waste heat 198 transfer from one or more of the cooling medium 212 and oil 237 to the atmosphere 245, a proportional valve 240 may divert a portion of waste heat 198 from the liquid-to-air heat exchanger 250 that rejects waste heat 198 from the cooling circuit 190 and or oil circuits (175, 180, 185) to the atmosphere 245 based on one or more of a target cooling circuit temperature 220, a target cab temperature 224, and a target oil temperature 252.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "a" and "b" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A work machine comprising:
    a prime mover, an electric motor supplying at least a portion of power of the prime mover;
    an electric motor fluid circuit adapted to remove waste heat from the electric motor;
    a transmission fluid circuit adapted to lubricate a moving part of a transmission powered by the prime mover, the transmission fluid circuit having waste heat;
    a hydraulic circuit adapted to transmit power from the prime mover to a moving component of the work machine, the hydraulic circuit having waste heat;
    a cooling circuit circulating a cooling medium, the cooling circuit absorbing the waste heat from one or more of the electric motor fluid circuit, the transmission fluid circuit, and the hydraulic circuit; and
    a controller adapted to control diversion of at least a portion of the waste heat from the cooling circuit to at least a portion of a cab of the work machine.

2. The work machine of claim 1, further comprising:
    a heat exchanger, the heat exchanger including a heat exchanger bypass valve wherein the heat exchanger bypass valve restricts a portion of waste heat transfer from one or more of the electric motor fluid circuit, the transmission fluid circuit, and the hydraulic circuit, to the cooling circuit.

3. The work machine of claim 2, wherein the heat exchanger bypass valve moves to a full bypass position when one or more of a target cooling circuit temperature and a target cab temperature is reached, wherein the full bypass position restricts all waste heat transfer from one or more of the electric motor fluid circuit, the transmission fluid circuit, and the hydraulic circuit, to the cooling circuit when one or more of a target cooling circuit temperature and a target cab temperature is reached.

4. The work machine of claim 2, further comprising:
    a proportional valve coupled to one or more of the cooling circuit, the electric motor fluid circuit, the transmission fluid circuit, and the hydraulic circuit; the proportional valve diverting a portion of the waste heat from the cooling circuit to an atmosphere based on one or more of a target oil circuit temperature, target cooling circuit temperature and a target cab temperature.

5. The work machine of claim 4, wherein the cab heating portion may heat one or more of the cab air temperature, a cab seat, and a control handle.

6. The work machine of claim 1, wherein the cooling circuit comprises a cab heating portion positioned one or more of adjacent to the cab and within the cab.

7. The work machine of claim 1, wherein the controller controls diversion of the waste heat based on one or more of a target cooling circuit temperature, the cooling circuit temperature, the cab temperature, and a target cab temperature.

8. The work machine of claim 1, further comprising:
an electric cab heater coupled to one or more of the cooling circuit and the cab, the electric cab heater supplementing heat to at least the portion of the cab.

9. The work machine of claim 1, wherein the controller controls a rate of diversion of the waste heat by adjusting a pump rate of the cooling medium by a pump coupled to the cooling circuit.

10. The work machine of claim 1, wherein the cooling medium comprises one or more of water and glycol.

11. A system for scavenging waste heat associated with a work machine including a hydraulic circuit and a transmission fluid circuit, the system comprising:
a prime mover, the prime mover electrically sourced and adapted to supply mechanical energy for operating the work machine;
a transmission fluid circuit adapted to lubricate a moving part of a transmission powered by the prime mover, the transmission fluid circuit having waste heat;
a hydraulic circuit adapted to transmit power from the prime mover to a moving component of the work machine, the hydraulic circuit having waste heat;
an electric cab heater adapted to supply heat to at least a portion of the cab; and
a controller adapted to coordinate a scavenging of waste heat,
wherein the controller is adapted to control diversion of a portion of the waste heat created by one or more of the hydraulic circuit, the transmission fluid circuit, and the prime mover such that at least a portion of a demand for power from the electric cab heater is offset by the waste heat created, in response to an increase in demand for power associated with operation of the electric cab heater.

12. The system of claim 11, further comprising:
a heat exchanger, the heat exchanger including a bypass valve wherein the heat exchanger bypass valve restricts a portion of waste heat transfer from one or more of the hydraulic circuit, the transmission fluid circuit and the prime mover to the cab of the work machine.

13. The system of claim 12, wherein the heat exchanger bypass valve moves to a full bypass position when a target cab temperature is reached, wherein the full bypass position restricts all waste heat transfer from one or more of the hydraulic system, the transmission fluid circuit, and the prime mover to the cab when a target cab air temperature is reached.

14. The system of claim 12, further comprising:
a proportional control valve coupled to the work machine, the proportional control valve diverting a portion of the waste heat from one or more of cooling circuit, the electric motor fluid circuit, the transmission fluid circuit, and the hydraulic circuit, to an atmosphere based on one or more a target oil circuit temperature, a target cooling circuit temperature, and a target cab air temperature.

15. A method of scavenging waste heat from a work machine for heating a cab, the method comprising:
providing one or more of an electric motor fluid circuit, a transmission fluid circuit, and a hydraulic fluid circuit;
providing a cooling circuit circulating a cooling medium, the cooling circuit coupled to one or more or more of the electric motor fluid circuit, a transmission fluid circuit, and a hydraulic fluid circuit;
absorbing waste heat by the cooling circuit through a heat exchanger from one or more of the electric motor fluid circuit, the transmission fluid circuit, and the hydraulic circuit;
diverting waste heat in the cooling circuit towards the cab of the work machine; and
releasing waste heat through a heat exchanger in at least a portion of the cab of the work machine.

16. The method of claim 15, wherein a controller is adapted to coordinate diversion of waste heat from one or more of the electric motor fluid circuit, the transmission fluid circuit, and the hydraulic circuit, and release of waste heat to at least the portion of the cab through a heat exchanger.

17. The method of claim 16, wherein the heat exchanger comprises a heat exchanger bypass valve, wherein the heat exchanger bypass valve restricts a portion of waste heat transfer from one or more of the electric motor fluid circuit, the transmission fluid circuit, and the hydraulic circuit, to the cooling circuit.

18. The method of claim 17 further comprising:
restricting waste heat from being released to at least a portion of the cab when one or more of a target cooling circuit temperature and a target cab temperature is reached, the restriction of waste heat from one or more of the electric motor fluid circuit, the transmission fluid circuit, and the hydraulic circuit, to the cooling circuit occurring when the heat exchanger bypass valve moves to a full bypass position.

19. The method of claim 15, wherein a controller is adapted to control coordinate diversion of waste heat from one or more of the cooling circuit, the electric motor fluid circuit, the transmission fluid circuit, and the hydraulic circuit to an atmosphere based on one or more of a target oil circuit temperature, target cooling circuit temperature and a target cab temperature.

20. The method of claim 15, wherein the cooling circuit comprises a cab heating portion positioned one or more adjacent to the cab and within the cab, the cab heating portion heating one or more of the cab air temperature, a cab seat, and a control handle.

* * * * *